United States Patent
Pos

(10) Patent No.: US 11,560,073 B2
(45) Date of Patent: Jan. 24, 2023

(54) CHILD SAFETY SEAT OR BABY CARRIER FOR MOUNTING ON A MOTOR VEHICLE SEAT AND SIDE IMPACT BAR FOR SUCH A SEAT

(71) Applicant: CYBEX GMBH, Bayreuth (DE)

(72) Inventor: Martin Pos, Bayreuth (DE)

(73) Assignee: CYBEX GmbH, Bayreuth (DE)

( * ) Notice: Subject to any disclaimer, the term of this patent is extended or adjusted under 35 U.S.C. 154(b) by 105 days.

(21) Appl. No.: 14/409,405

(22) PCT Filed: Jun. 13, 2013

(86) PCT No.: PCT/EP2013/062216
§ 371 (c)(1),
(2) Date: Aug. 18, 2015

(87) PCT Pub. No.: WO2013/189819
PCT Pub. Date: Dec. 27, 2013

(65) Prior Publication Data
US 2015/0336482 A1   Nov. 26, 2015

(30) Foreign Application Priority Data

Jun. 18, 2012 (DE) .................... 20 2012 102 240.0
Jul. 4, 2012 (DE) .................... 20 2012 102 471.3

(51) Int. Cl.
*B60N 2/28* (2006.01)
*B60N 2/42* (2006.01)
*B60N 2/427* (2006.01)

(52) U.S. Cl.
CPC .......... *B60N 2/2821* (2013.01); *B60N 2/286* (2013.01); *B60N 2/2845* (2013.01);
(Continued)

(58) Field of Classification Search
None
See application file for complete search history.

(56) References Cited

U.S. PATENT DOCUMENTS 4,385,783 A * 5/1983 Stephens .................. A47C 1/03
297/452.55
4,512,604 A * 4/1985 Maeda ...................... B60N 2/02
280/748

(Continued)

FOREIGN PATENT DOCUMENTS

CN          201587341 U       9/2010
DE          198 14 920 A1    10/1999
(Continued)

OTHER PUBLICATIONS

Search report issued in parent application DE 20 2012 102 471.3 dated Feb. 7, 2013, 5 pages.
(Continued)

*Primary Examiner* — David E Allred
(74) *Attorney, Agent, or Firm* — Faegre Drinker Biddle & Reath LLP

(57) ABSTRACT

A child safety seat or a baby carrier for mounting on a motor vehicle seat, particularly a motor vehicle side seat, has a seat tray and a side impact bar mounted thereon which can be moved from a rest position located in particular within a standard width to a functional position located in particular outside thereof, and vice versa, wherein the side impact bar is positioned in particular on both sides of the seat tray so as to transmit any lateral forces behind the back of a child sitting in the child safety seat and to direct said lateral forces into the seat tray. A side impact bar is used with and mounted on the child safety seat or baby carrier.

21 Claims, 17 Drawing Sheets

(52) U.S. Cl.
CPC ......... *B60N 2/2863* (2013.01); *B60N 2/2872* (2013.01); *B60N 2/2884* (2013.01); *B60N 2/4235* (2013.01); *B60N 2/42709* (2013.01)

(56) References Cited

U.S. PATENT DOCUMENTS

| | | | | |
|---|---|---|---|---|
| 4,750,783 | A * | 6/1988 | Irby | B60N 2/2848 |
| | | | | 297/130 |
| 4,770,468 | A * | 9/1988 | Shubin | B60N 2/2821 |
| | | | | 297/256.15 |
| 5,645,317 | A | 7/1997 | Onishi et al. | |
| 5,716,094 | A * | 2/1998 | Bhalsod | B60N 2/42709 |
| | | | | 296/187.12 |
| 6,033,017 | A | 3/2000 | Elqadah et al. | |
| 6,237,991 | B1 | 5/2001 | Weber | |
| 6,478,377 | B2 | 11/2002 | Kassai et al. | |
| 6,494,531 | B1 * | 12/2002 | Kim | B60N 2/2821 |
| | | | | 297/94 |
| 6,682,143 | B2 * | 1/2004 | Amirault | B60N 2/2851 |
| | | | | 297/250.1 |
| 7,159,923 | B2 * | 1/2007 | Rajasingham | B62D 21/15 |
| | | | | 296/68.1 |
| 7,637,568 | B2 * | 12/2009 | Meeker | B60N 3/102 |
| | | | | 297/250.1 |
| 7,775,552 | B2 * | 8/2010 | Breuninger | B60N 2/42736 |
| | | | | 280/730.2 |
| 7,946,614 | B2 | 5/2011 | Breuninger et al. | |
| 8,020,658 | B2 * | 9/2011 | Rajasingham | B62D 21/15 |
| | | | | 180/209 |
| 8,136,835 | B2 * | 3/2012 | Rajasingham | B60N 2/4235 |
| | | | | 280/730.2 |
| 8,449,030 | B2 | 5/2013 | Powell et al. | |
| 8,459,739 | B2 * | 6/2013 | Tamanouchi | B60N 2/2806 |
| | | | | 297/256.12 |
| 8,820,830 | B2 | 9/2014 | Lich et al. | |
| 9,090,181 | B2 * | 7/2015 | Williams | B60N 2/2821 |
| 9,440,563 | B2 * | 9/2016 | Rajasingham | B60N 2/2884 |
| 2002/0093231 | A1 | 7/2002 | Estrada | B60N 2/888 |
| | | | | 297/216.12 |
| 2004/0108752 | A1 * | 6/2004 | Rajasingham | A61G 3/0808 |
| | | | | 296/68.1 |
| 2004/0155500 | A1 * | 8/2004 | Amirault | B60N 2/2851 |
| | | | | 297/256.11 |
| 2005/0077746 | A1 * | 4/2005 | Rajasingham | B62D 21/15 |
| | | | | 296/26.08 |
| 2007/0246982 | A1 * | 10/2007 | Nett | B60N 2/809 |
| | | | | 297/250.1 |
| 2007/0252368 | A1 * | 11/2007 | Balser | B60R 21/0134 |
| | | | | 280/730.2 |
| 2009/0008914 | A1 * | 1/2009 | Breuninger | B60N 2/4279 |
| | | | | 280/730.2 |
| 2009/0152913 | A1 | 6/2009 | Amesar et al. | |
| 2011/0031055 | A1 * | 2/2011 | Rajasingham | B60N 2/64 |
| | | | | 180/271 |
| 2016/0039319 | A1 * | 2/2016 | Zhang | B60N 2/2872 |
| | | | | 297/216.11 |
| 2018/0126877 | A1 * | 5/2018 | Williams | B60N 2/2863 |
| 2019/0061571 | A1 * | 2/2019 | Mason | B60N 2/2872 |
| 2020/0346613 | A1 * | 11/2020 | Frank | B60N 2/2803 |
| 2021/0078462 | A1 * | 3/2021 | Cheng | A01K 1/0236 |
| 2021/0394698 | A1 * | 12/2021 | Tanabe | B60R 21/207 |
| 2022/0001775 | A1 * | 1/2022 | Chen | B60N 2/2839 |
| 2022/0073025 | A1 * | 3/2022 | Kang | B60R 21/23138 |
| 2022/0097576 | A1 * | 3/2022 | Zhang | B60N 2/2884 |
| 2022/0111776 | A1 * | 4/2022 | Mo | B60N 2/286 |
| 2022/0126732 | A1 * | 4/2022 | Zhang | B60N 2/919 |
| 2022/0176854 | A1 * | 6/2022 | Cui | B60N 2/2863 |

FOREIGN PATENT DOCUMENTS

| | | |
|---|---|---|
| DE | 19952777 C1 | 12/2000 |
| DE | 19839519 B4 | 7/2004 |
| DE | 202005011742 U1 | 11/2005 |
| DE | 10 2008 002 822 A1 | 11/2009 |
| DE | 102008043617 A1 | 5/2010 |
| EP | 0470413 B1 | 3/1995 |
| EP | 1122120 A1 | 8/2001 |
| EP | 2275303 B1 | 5/2013 |
| JP | 2000-296734 A | 10/2000 |
| JP | 2001-294064 A | 10/2001 |
| JP | 2008-515695 A | 5/2008 |
| KR | 10-0139470 B1 | 7/1998 |
| KR | 10-2010-0115737 A | 10/2010 |
| TW | M291910 U | 6/2006 |
| WO | 2007/003923 A1 | 1/2007 |
| WO | 2007/073944 A1 | 7/2007 |

OTHER PUBLICATIONS

Examination Report issued in related European patent application EP 13729020.1, dated Feb. 19, 2016, 7 pages.
Office Action issued in related Chinese patent application CN 201380044322.X, dated Mar. 3, 2016, 16 pages.
Office Action issued in related application JP 2015-517688, dated Sep. 12, 2017, with English language translation, 8 pages.
Office Action issued in related application KR 10-2014-7036982, dated Jun. 27, 2019, with English language translation, 19 pages.
Office Action issued in related application KR 10-2014-7036982, dated Mar. 29, 2020, with machine generated English language translation, 19 pages.
Office Action issued in related application KR 10-2021-7004459, dated Apr. 7, 2021, with machine generated English language translation, 22 pages.

* cited by examiner

CHILD SAFETY SEAT OR BABY CARRIER FOR MOUNTING ON A MOTOR VEHICLE SEAT AND SIDE IMPACT BAR FOR SUCH A SEAT

CROSS REFERENCE TO RELATED APPLICATIONS

This application is the U.S. national phase of International Patent Application No. PCT/EP2013/062216 filed Jun. 13, 2013, which claims the benefit of German Application Nos. 20 2012 102 240.0 filed Jun. 18, 2012 and 20 2012 102 471.3 filed Jul. 4, 2012, the entire content of which is incorporated herein by reference.

BACKGROUND

Disclosed herein is a child safety seat, or an infant car seat, to be mounted on a motor vehicle seat, as well as a side-collision protection that may be mounted to such a seat or such an infant car seat.

In the scope of this disclosure, the term "child safety seat" is to be understood as a generic term for child safety seats and infant car seats. Therefore, the features provided for a child safety seat within the scope of this disclosure generally also apply to an infant car seat and vice versa, except where otherwise noted. The same applies to the term "child", which is also to be understood as a generic term for children, as well as infants.

Child safety seats and infant car seats, which may be mounted on a motor vehicle seat, have been known for quite some time. Such child safety seats or infant car seats serve as seats for infants, toddlers and children and offer them increased protection, especially in the event of an accident. The attachment of such child safety seats generally occurs by the use of the car's seatbelt system or via Isofix latches. In the event of an accident, this type of attachment secures the child safety seat to the motor vehicle seat, so that it will remain on the motor vehicle seat and isn't catapulted forward, especially in the event of a rear-end collision. However, these seats revealed problems in side collisions, as neither the belt's attachment, nor the Isofix latches sufficiently secured the child safety seat or the infant car seat from a sideway motion of the seat. However, this is important to the safety of the child in the child safety seat. Thus, in the past, existing child safety seats were provided with a side-collision protection, such as described in German patent document DE 20 2009 010 536 U1 or in U.S. patent publication U.S. 2009/0152913 A1. The apparatus disclosed therein is an energy absorbing element in the form of a strap or an air cushion and stretches across the child safety seats' side. However, in the past, it has become clear that apparatuses, such as described in DE 20 2009 010 536 U1 or U.S. 2009/0152913 A1, are not capable of providing a maximum of safety for the child in the child safety seat, due to the fact, that according to the disclosure, an exchange of power directly impacts the child in the child safety seat, and the child safety seats cannot sufficiently absorb an impact and/or dissipate it.

SUMMARY

Disclosed herein is a child safety seat for mounting to a motor vehicle seat which avoids the aforementioned disadvantage and offers improved side-collision protection, which reduces the kinetic impact on the child placed in the child safety seat.

In particular, this problem is solved by a child safety seat, to be mounted on a motor vehicle seat, more specifically a motor vehicle seat with a seat shell featuring a side-wall protection, which may for example be situated at a standard width of 440 mm, according to the AGREEMENT CONCERNING THE ADOPTION OF UNIFORM TECHNICAL PRESCRIPTIONS FOR WHEELED VEHICLES, EQUIPMENT AND PARTS WHICH CAN BE FITTED AND/OR BE USED ON WHEELED VEHICLES AND THE CONDITIONS FOR RECIPROCAL RECOGNITION OF APPROVALS GRANTED ON THE BASIS OF THESE PRESCRIPTIONS, (Revision 2, including the amendments which entered into force on 16 Oct. 1995), E/ECE/324, E/ECE/TRANS/505, Rev. I/Add. I5/Rev. 6 on 19 May 2009, Annex 17-Appendix 2, of the child safety seats, resting position to for example a functional state situated outside of the standard width and vice versa, wherein the side-collision protection is positioned in such a way, particularly on both sides of the seat shell, that possible side forces are led behind the back of the child placed in the child safety seat and into the seat shell.

In this connection, an important aspect lies in the side-collision protection being attached to the seat shell in such a way, that a transfer or power or energy does not directly impact the child's body, but is instead lead away from the child's body and into the seat shell. In this way, the side-collision protection for one serves as a crush zone, and also as a force transfer device, which would in the event of a collision lead the possibly occurring side-powers away from the child's side linearly, instead of into the child's body linearly, and which exhibits damping features. Very advantageously, this helps reduce the energy impacting the child in a child safety seat, so that the child's risk of injury is significantly reduced in comparison to the presently known child safety seats.

According to one embodiment disclosed herein, the side-collision protection comprises a side element, which, in its resting position, is in contact with the seat shell's side surface, particularly in a flat manner, or essentially inserted in or on, or retracted in or on the seat shell's side surface. In doing so, it can be ensured, that the child safety seat does not extend the provided side-collision protection further than a predetermined width, particularly the standard width, or the child safety seat's shell is curved in its resting position, and does not exceed a common width of a child safety seat in case of mounted or inserted side elements, which additionally improves the child safety seat's manageability.

Furthermore, the side element may be fold-out, retractable, extendable or pull-out and push-in, for use in functional position, or alternatively to such an embodiment in which the child safety seat is essentially bonded, removable from a resting position of the side element and attachable to an according receptor for the side element on the child safety seat, i.e. particularly attachable to the child safety seat's seat shell and also particularly mountable. At this point, it shall be noted that according to the disclosure, it is just as well possible not only to attach the side element to the child safety seat, but also that a child safety seat may thus be upgraded, by mounting such a side-collision protection with a side element, which may for example be designed as a folding part, to a predefined position, wherein the side-collision protection may be bonded to the child safety seat's seat shell, e.g. by adhesive bonding, clinching, or screwing. For this purpose, the side-collision protection features a side element which is formed as a folding part that may be rotated around an axis for the purpose of transferring from a resting position into a functional position and vice versa, wherein the folding part comprises at least one stop retainer, of which a locking bar takes hold, so that the folding part is locked in its functional position, wherein the interlock may be released by an user via an unlock button or an unlock slider, which is in each case assigned to one or two or more locking bars. Such a side-collision protection advantageously comprises a base plate or an attachment plate, via which the side-collision protection is in contact with the child safety seat's seat shell, as well as bonded therewith. The above described system consisting of a folding part, axis, stop retainer and a locking bar is mounted on this base plate of the attachment plate.

According to a further embodiment, the side-collision protection may also be constructively integrated into the child safety seat's shell, wherein for example, a special receptor for such a side-collision protection on the child safety seat's shell is preferable.

A telescopic slider version of the side element is intended, which preferably features a mushroom or disc-shaped end section, which in its resting position is in direct, and essentially flat contact with the seat shell's side area, and in its functional position may be brought from a position in which it is pushed into the seat shell, into a position in which it is pulled or pushed out of the seat shell. In this functional position, the side element's mushroom or disc-shaped end section is then in contact with the motor vehicle contact surface, or with a neighbouring child safety seat or a neighbouring side element of another child safety seat.

The side element's length and/or height are configurable. A configurable side element length is particularly advantageous for the use of the child safety seats with regard to using the invented items in different types of motor vehicles, due to the fact that different types of cars usually feature different distances with regard to the distance of the attachment apparatus for child safety seats from the motor vehicle door. Such a difference in distance may easily be remedied by a side element, which is adjustable with a regard to length. For the purpose of such a length configuration and preferably fixation at the desired length, a snap-in control (click lock) mechanism, snapping mechanism, folding mechanism, ratchet mechanism, telescope mechanism, thread or screwing mechanism or pulley mechanism is intended, wherein the aforementioned mechanisms may also be implemented in combination with each another, for example to first configure the side element's desired length, and subsequently, to lock it into the desired position, wherein the fixation may again be released from the functional position after using the child safety seat in order to bring the side element back into its resting position. Preferably a telescope mechanism is used in connection with this, by which, for example, a tubular designed side element is configured to the desired length. A subsequent fixation at the desired length may then, for example, be achieved by using a snapping mechanism.

According to a further embodiment, the side element, as previously mentioned, may also be designed as a folding part. This folding part may either be brought from a closed resting position into an open functional position, or, according to another advantageous embodiment, may also assume an inclined position between the resting and the fully open functional position by opening the folding part at an angle of less than 90° relative to the child safety seat's shell. In this case, the folding part may, for example, feature a cogging, by which a multitude of stop retainers are defined, which are grabbed by corresponding locking bars—of which there may be one or two—during the process of locking in place and of the fixation of the folding part. Thereby the side element's lateral reach may be varied with regards to its length, wherein the folding part is securely locked in place and supported by the locking bar grabbing the stop retainer. Therefore, it is possible to compensate for the distance between the child safety seat and a lateral motor vehicle contact surface, which may differ in each type of vehicle. For this purpose, the folding part may feature a ratchet mechanism.

Concerning this matter it shall be noted, that a contact of the side-collision protection side of the mushroom or disc-shaped end section is usually stabilized by a shut car door, wherein the side element, if the child safety seat is correctly positioned and mounted, e.g. by means of Isofix straps, may be extended or unfolded until the side element's mushroom or disc-shaped end section rests on another solid body part or a neighbouring child safety seat. In connection therewith, it is noted, that a combination of folding and sliding mechanism is also conceivable for the side element, e.g. by the side element being unfolded first, and then pulled out in a telescopic manner until a proper contact of the end section to a motor vehicle side area is ensured. With regards to this, it shall further be noted, that the end section, as previously mentioned, may be designed in a mushroom or disc-like shape. According to a further embodiment, it is, however, also possible to plug, screw or otherwise attach, preferably in a reversible manner, such an end section on the side element's end section. A mushroom or disc-shaped end section may also be realized by a suitable unfolding of the end section elements provided for that purpose. In connection with that, it is also intended to mount a connecting element to the side element's end section of a neighbouring child safety seat. Such a connecting element may, for example, be slid onto an appropriate side element's end section and locked in place by use of clamps, bolts or other known attachment mechanisms. A direct attachment of side elements, which are attached to two different child safety seats, is also possible. In doing so, optimal protection is ensured, not only for the child sitting closest to a motor vehicle contact surface, but also for a child that sits in a child safety seat or lays in an infant car seat which is attached to the rear middle seat of the motor vehicle. A child safety seat attached in such a manner, or an infant car seat attached in such a manner, respectively, may thus be supported against a motor vehicle contact surface via a neighbouring child safety seat or infant car seat, respectively.

The side element may optionally be adjusted with regard to its height. Such a height adjustment may, for example, take place in a longitudinal slot of the seat shell, wherein means of fixation are provided for each height position, by which the side element is firmly and reliably held in place at the respective height.

With regards to the side element's lateral reach it shall further be noted, that it essentially extends between a motor vehicle contact surface and the child safety seat. Thus an optimal transfer and redirection of energy is possible.

The side element is posed above the seat area of the child safety seat. Thereby, a tipping over of the child safety seat attached at its base may be prevented effectively. Thereby a stabilization of the child safety seat in its normal functioning position is perfectly achievable.

To ensure that possible side forces won't directly impact the child in the child safety seat in case of a side collision, as is the case with prior art child safety seats, but instead are rerouted around it and led into the seat shell, it is provided that the side element is arranged in a back section, particularly rearward of a back contact area of the child safety seat, or alternatively along the rear periphery of the child safety seats back section. In doing so, an optimal rerouting by the side-collision protection is possible, as the child is in not in reach of the side-collision effects, but instead there is the construction element of the child safety seat, namely the seat shell and therefore a direct energy transfer to the child is constructively avoided.

According to a further embodiment, the child safety seat features side elements on each side of the seat shell, particularly usable and configurable independent of each other. These side elements may, for example, be in contact with a contact surface of the motor vehicle at different heights, whereby, for one, a puffer area is created, but also the rerouting of energy in the case of a side collision may be improved. In each case it is important, that the side-collision protection is extended, unfolded or pushed or pulled open toward a contact surface of the motor vehicle as far as possible, so that preferably a flat contact of the side element's mushroom or disc-like end section on the motor vehicle surface is ensured. In the case that several side elements are provided on one side of the child safety seat, these may essentially extend horizontally or at an angle to one another.

The side elements provided on each side of the seat shell may, particularly within a seat shell construction, be bonded together. Such a construction, for one, increases the seat shell's rigidity, and, on the other, hand allows for an especially simple and precise mounting. Such an embodiment is best suited for telescopic extendible side elements.

A side element may feature a receptor and/or contact and/or bonding and/or locking apparatus for grabbing or locking in a neighbouring side element, particularly a neighbouring child safety seat. If such an embodiment is desired, the side element's mushroom or disc-like end section may accordingly be provided with a receptor and/or contact and/or bonding and/or locking apparatus, so that two child safety seats with appropriate side-collision protection may be connected to each other via these, and essentially support each other as previously mentioned.

As also previously mentioned, the side element may be designed as a folding part, which may be rotated around an axis to be brought from a resting position into the functional position and vice versa, wherein the folding part features at least one locking bar, onto which a stop retainer locks in its functional position, so that the folding part in a functional position is locked in place, wherein the fixation may be released by a user by using the unlock button or slider, of which one is preferably allocated per locking bar.

The locking bar in its resting position is, particularly by a spring element, pre-loaded in such a way, that the locking bar is automatically brought into a predefined relaxed position during a change from the resting position into the functioning position, and thus moves with the stop retainer in locking and is thereby locked in place in the functional position.

For this purpose, the locking bar in the resting position is held in place in its pre-loaded position by the folding part, particularly by side pieces of the folding part. When the locking bar is folded from its resting position into its functioning position, the locking bar is released by an accompanying unfolding of the side pieces of the folding part, which holds the locking bar(s) in its or their pre-loaded position, so that the locking bar slides past or falls out of the folding part's side pieces and comes in contact with, preferably in locking contact with the folding part's stop retainer. The stop retainer may also be designed from the folding part's side pieces or a nose formed from the folding piece, wherein the stop retainer may be designed either on the folding piece itself, or alternatively on one of the holding devices which are tightly bonded with the folding piece. Further embodiments result from the sub claims.

BRIEF DESCRIPTION OF THE DRAWINGS

An execution example is described below, with the help of figures.

DETAILED DESCRIPTION

Figure 1:
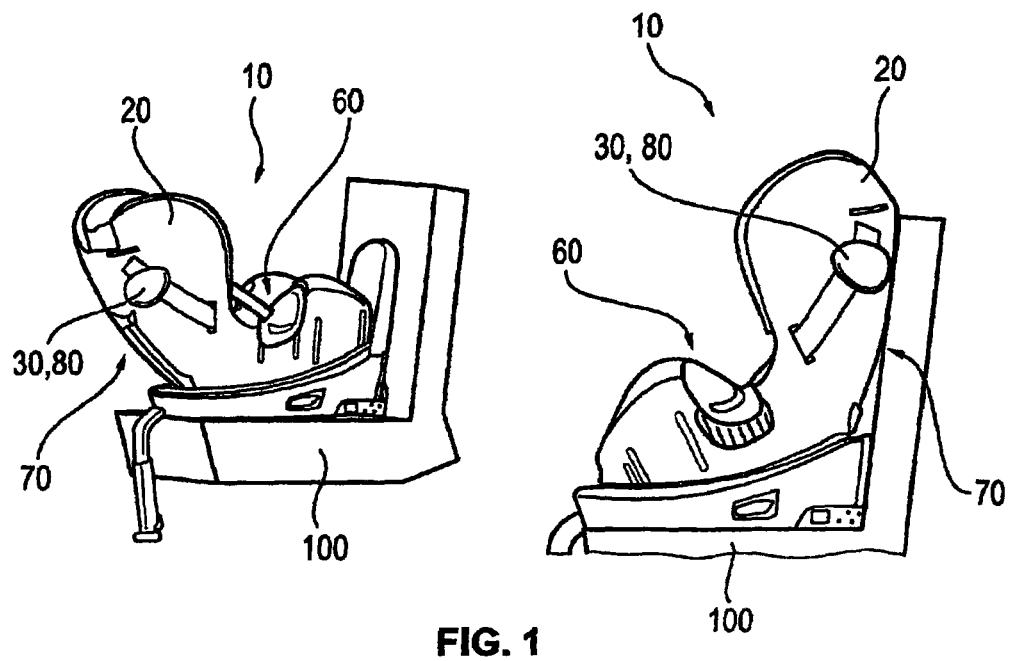
FIG. 1 shows a schematic illustration of the child safety seat disclosed herein, facing forward and backwards.

The following description uses same reference numerals for like parts or parts fulfilling the same function.

FIG. 1 shows, in two different illustrations, a child safety seat 10 disclosed herein, attached to a motor vehicle seat 100 in positions facing forward and backwards. The child safety seat 10 of this embodiment is designed in such a manner, that it can be rotated, wherein the child safety seat features a seat shell 20, as well as a side element 30, which are in their resting position according to the illustration. In this case, resting position refers to a pushed-in position of the side elements 30. According to FIG. 1 it is recognizable that the side element is located above the seat area 60 in the child seat's 10 back section 70.

Figure 2:
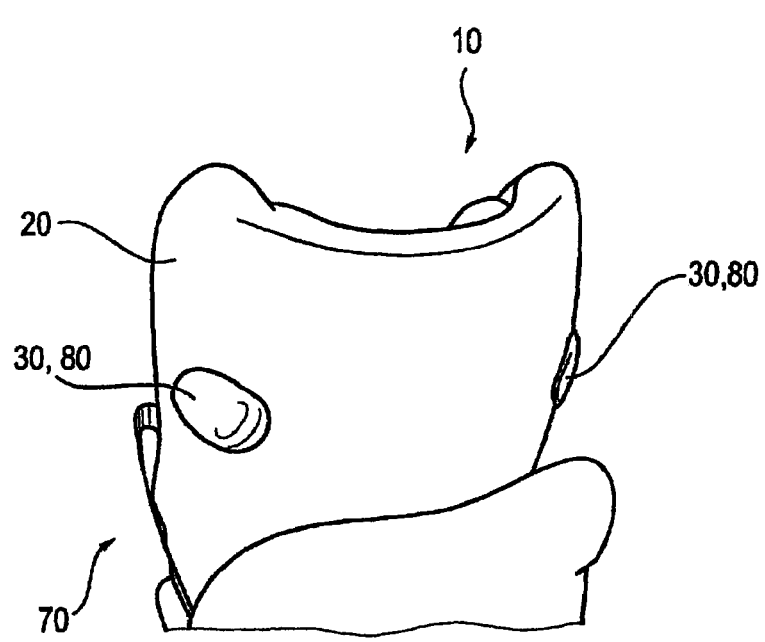
FIG. 2 shows a detailed view of a schematic illustration of the child safety seat's back section.

FIG. 2 shows a rear view of back sections 70 of the child safety seat 10, wherein each side of the back section 70 recognizably shows a side element 30 with respective end section 80. End section 80 is designed in a disc-like shape and is in contact with the back section 70 of the child safety seat 10. The side-collision protection is in the resting position, i.e. in contact with the back section 70 in pushed in position.

Figure 3:
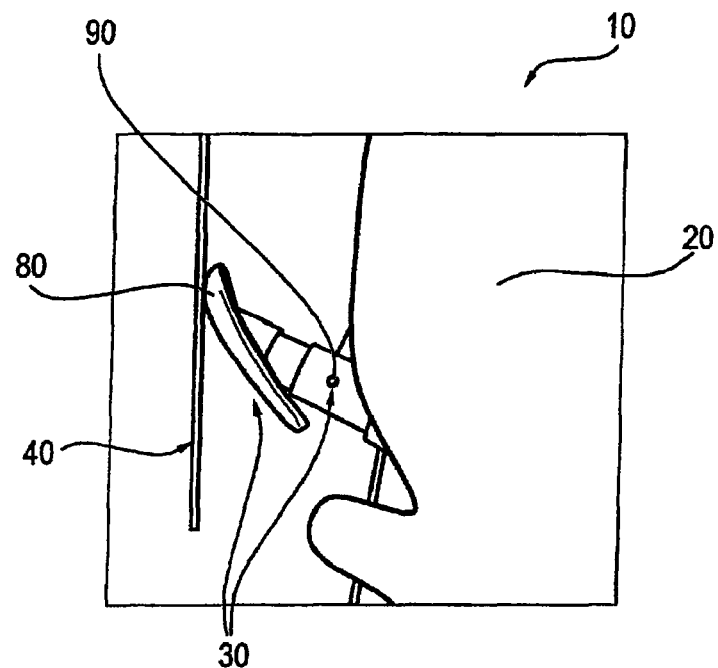
FIG. 3 shows an embodiment of a side-collision protection in the functional position.

FIG. 3 shows the back section 70 of FIG. 2, wherein the side element 30 is extended to the left in a telescopic manner and in contact with a motor vehicle contact area 40, which is shown schematically. The side element 30 features a fixation mechanism 90, in which a cam latch extends through an opening. Pushing the cam latch in allows the side element 30 to be pushed together in a telescopic manner and to be brought into a resting position. For this purpose the side element is pushed back into the back section 70 behind a back contact area of the child safety seat.

Figure 4:
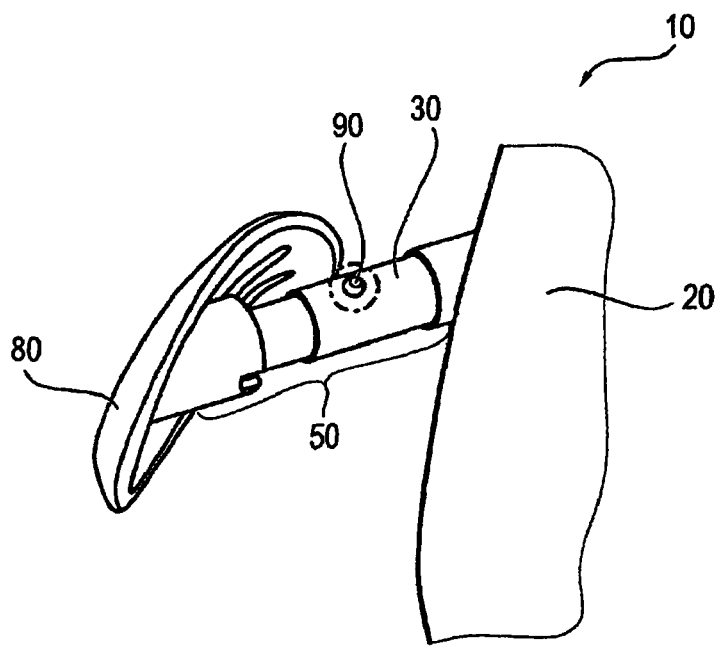
FIG. 4 shows a detailed illustration of a schematic view of the side collision protection according to the embodiment of FIG. 3.

FIG. 4 shows the side-collision protection according to FIG. 3—viewed from the front, where in the mushroom or disc-like end section 80 of the side elements 30 is easy to recognize. FIG. 4 also shows how the length of the side element 30 length is extendable in a telescopic manner and can be locked in place via a fixation mechanism 90.

Figure 5:
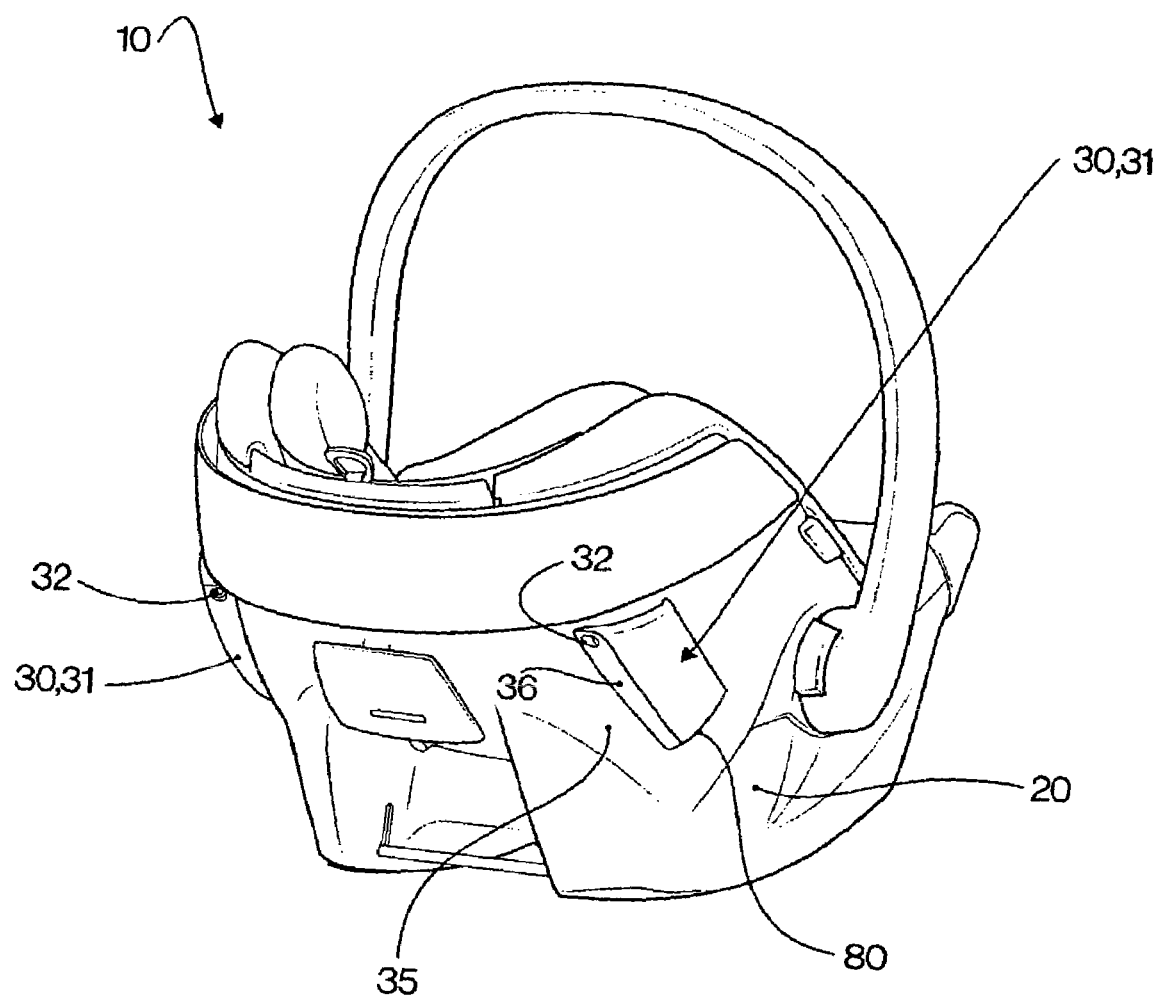
FIGS. 5 and 6 show a schematic illustration of a further embodiment of a side-collision protection on an infant car seat in the resting and functional position.
Figure 6:
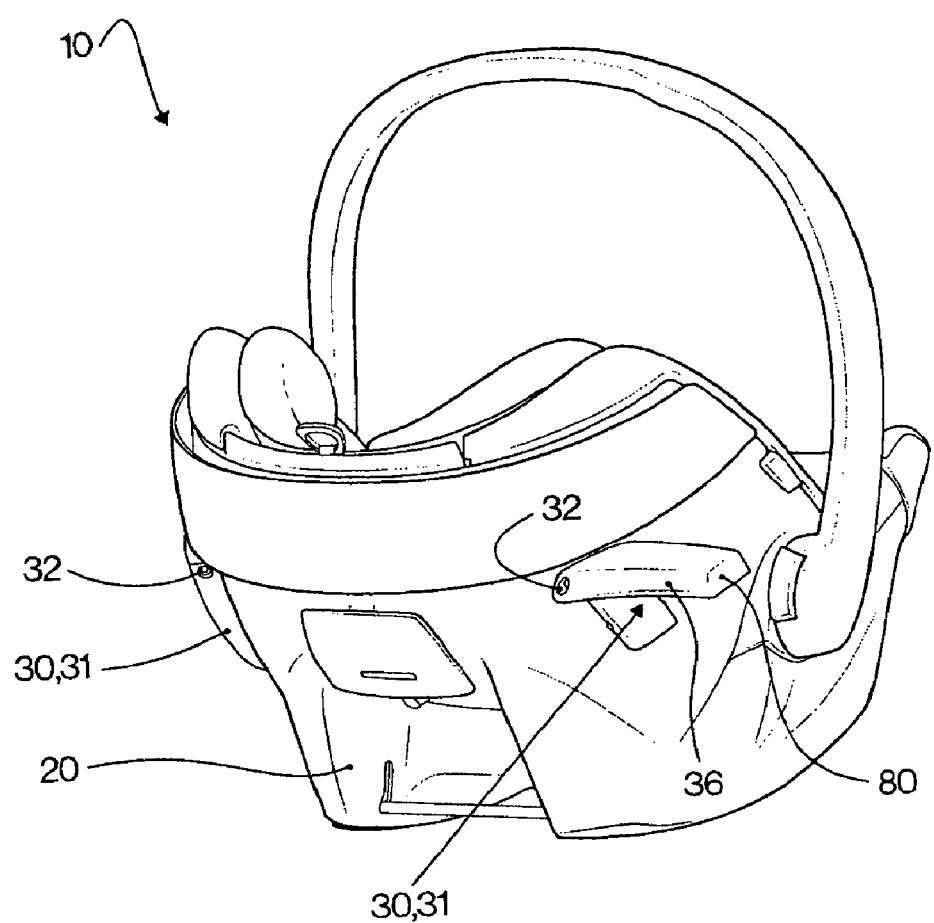

FIGS. 5 and 6 each show in a schematic illustration, a child safety seat in the form of an infant car seat 10. The child safety seat features a seat shell 20, which has a side collision protection attached to each side of its rearward, behind a back section located area. The side-collision protection consists of a side element 30, formed from a folding part 31, which can be rotated around an axis 32. The folding part 31 features two side pieces 36 as well as an end section 80. In FIG. 5, a folding part 31, in its resting position, essentially rests flat on the side area 35 of seat shell 20, while in FIG. 6, the side element 30, shown therein on the right, is present in an unfolded manner, wherein a folding part 31 essentially sticks out from seat shell 20 of the child safety seats 10. A folding part 31 of the side-collision protection, as arranged on the left side of the child safety seats in FIGS. 5 and 6 is in each case in its resting position, i.e. essentially resting flat on the side area 35 of the seat shell 20.

Figure 7:
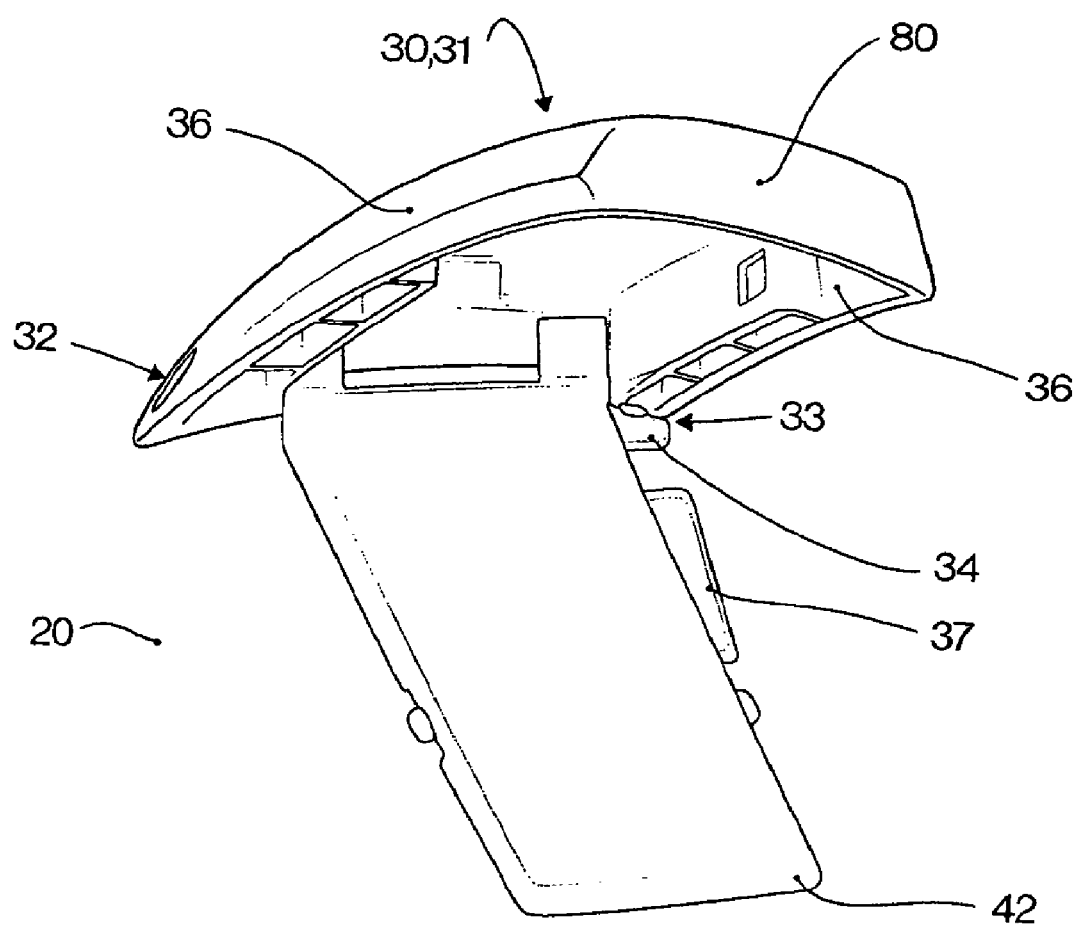
FIGS. 7 and 8 show detailed schematic illustrations of the side-collision protection according to FIGS. 5 and 6 comprising a one-button activator.
Figure 8:
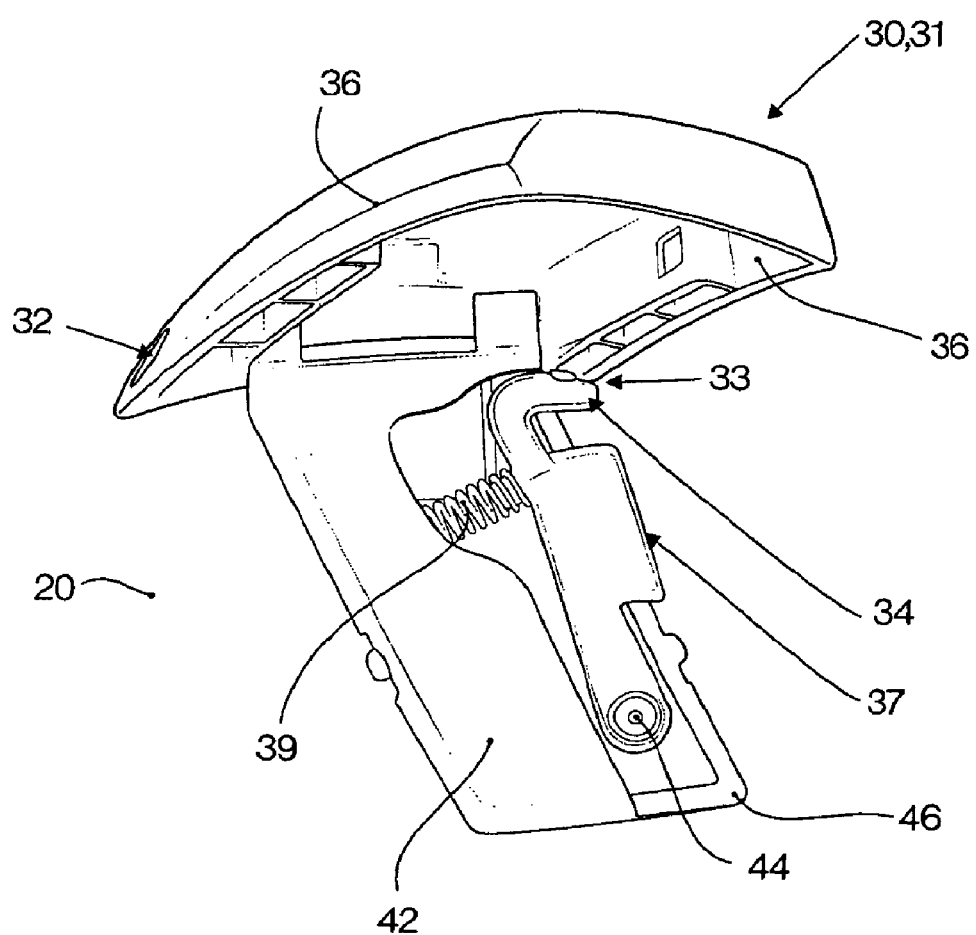

In FIGS. 7 and 8, the side element 30 from FIG. 6 is shown in a detailed illustration, wherein the side collision protection solution shows a one-button solution, featuring the folding part 31 on one side only, i.e. featuring a stop retainer 33, shown on the right side of FIGS. 7 and 8, which grabs onto a locking bar 34. FIG. 7 shows a schematic illustration of the side-collision protection, as used with a child safety seat or an infant car seat, namely in such a way, that a mechanism, by which the locking bar 34 is actuated, is covered by a cover plate 42. Locking bar 34 extends from this cover plate sideways in such a way that is comes in contact with a stop retainer 33, so that the folding part 31 is securely held in its functioning position and can only be released by pressing the release button 37 and, at the same time, is brought into its initial resting position, wherein the locking bar 34 may be moved out of its lock with the stop retainer 33 by using the release button 37.

FIG. 8 shows a detailed view of the underlying fixation mechanism allowing for an automatic interlocking of the stop retainer 33 with the locking bar 34, wherein a part of the cover plate 42 was removed for the purpose of demonstrating the mechanism. In FIG. 8 it is recognizable that the locking bar 34, as well as the release button 37 are formed in one piece and create a lever which may be deviated around the locking bar axis 44 and is thereby pre-loaded by the spring element 39, that locking bar 34 is automatically brought into a locking position with the stop retainer 33 as soon as the folding part 31 is moved from its resting position into its functional position. As long as the folding part 31 is in its resting position, the locking bar 34 will be pushed back into its pre-loaded position by side piece 36 of the folding part 31, which has been assigned to it, from which the locking bar 34 will automatically be moved into the locking position with the stop retainer 33 in the event of it being flipped up.

As long as the folding part 31 is in its resting position, the locking bar 34 will be pushed back into its intended position by side piece 36 of the folding part 31, from which the locking bar 34 is automatically moved into the locking position with the stop retainer 33 in the event of the folding part 31 being flipped up, when the side piece 36 of the folding parts 31 has flipped up and away so much, that holding back of the locking bar 34 by side piece 36 is no longer possible. At this point it shall be noted, that, in this description, the terms "top" "bottom" "right" and "left" only serve as a better demonstration of the illustrations shown in each of the figures and therefore, these terms are not to be understood as limiting the scope of the disclosure, for the side-collision protection is indeed preferably attached to a child safety seat or an infant car seat in the illustrated manner, yet another functional arrangement is also possible, e.g. by the folding part being brought from resting position into its functional position from top to bottom, rather than bottom to top. Therefore, the folding part 31 may functionally also be folded from behind, from the front or from front to back or diagonally, wherein finally it is of significance, that support of child safety seats or the infant car seat by side element 30, or the folding part 31, respectively, may occur.

As can also be recognized in FIGS. 7 and especially 8, the release button 37 located on the same level as the locking bar 34 is pushed to the side in the event of an expanding of the locking bar 34 and a locking with the stop retainer 33, so that release button 37 extends outward through the cover plate 42. For releasing the locking bar 34 from the stop retainer 33, the release button 37 may be pushed in the direction of the cover plate 42 by a user, wherein the locking bar 34 is simultaneously released from its lock with the stop retainer 33, so that a flipping back of the folding part 31 from its functional position into its resting position becomes possible.

Figure 9:
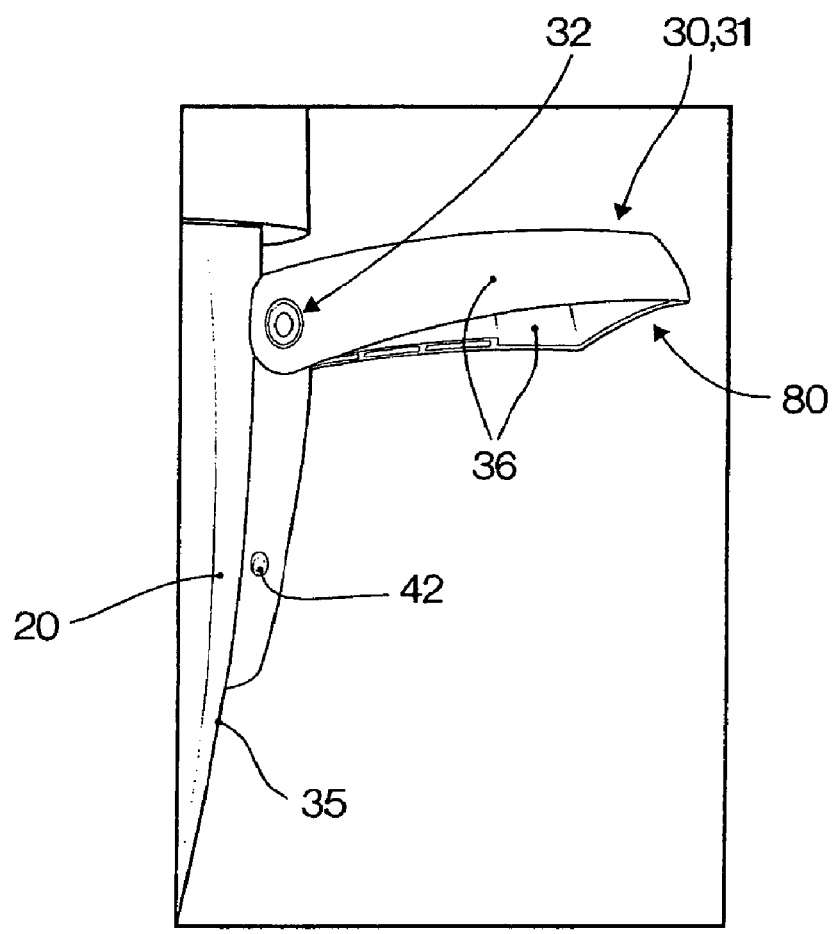
FIG. 9 shows a side view in a schematic illustration of the one-button activated embodiment according to FIG. 7.
Figure 10:
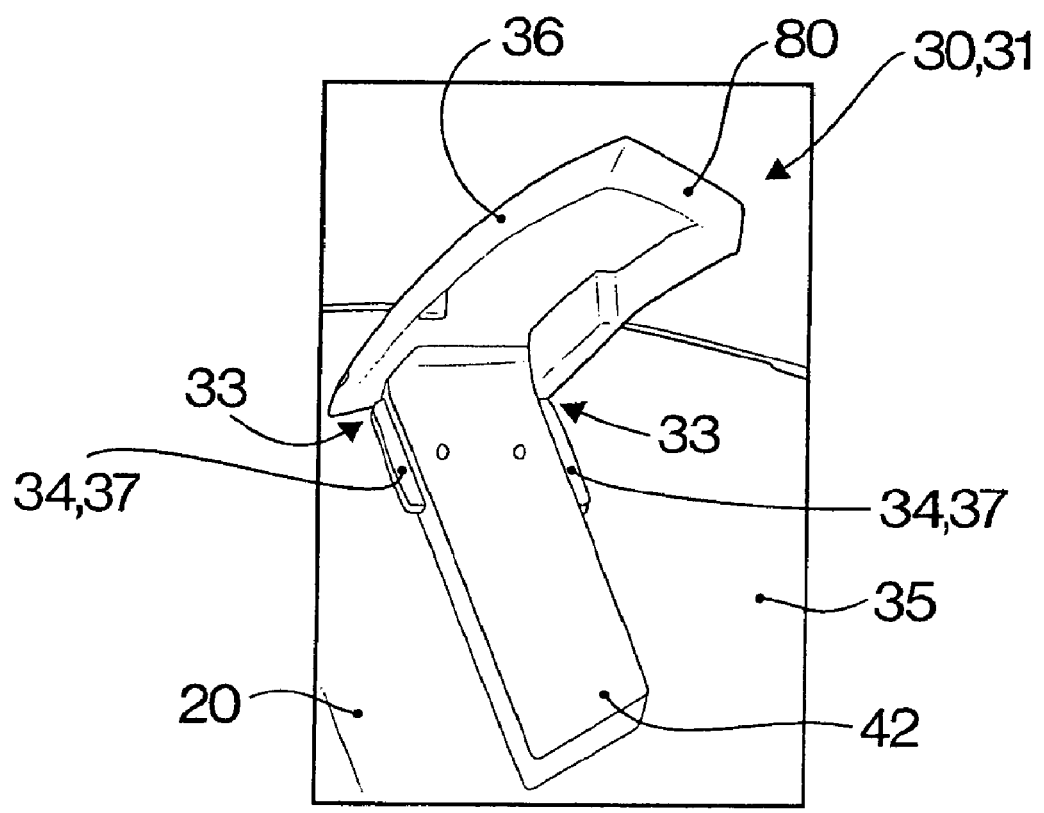
FIGS. 10-11 show a schematic, as well as an application illustration of a further embodiment of the side-collision protection, in a functional position.
Figure 11:
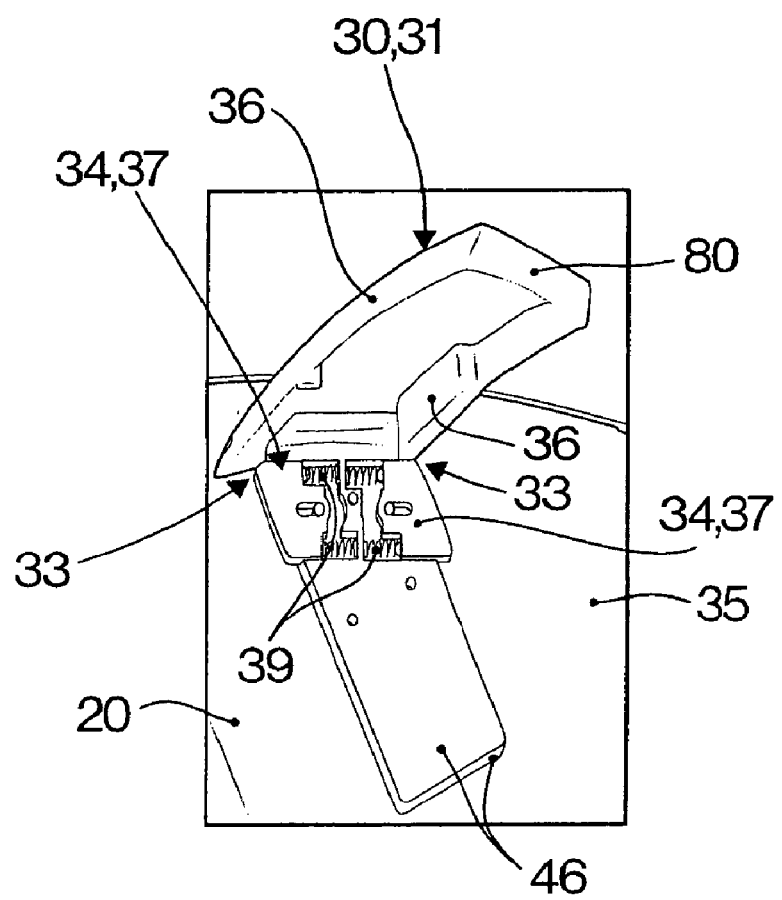

FIG. 9 shows an embodiment of a side-collision protection, posed on side area 35 of the seat shell 20 and illustrated according to the embodiment shown in FIGS. 7 and 8 in schematic view. Here it needs to be noted that the axis 32, around which the folding part 31 can be moved, is located outside of the seat shell, FIGS. 10 and 11 show a further embodiment of a side-collision protection, wherein according to this embodiment in each case two locking bars 34 are provided, as well as two release buttons 37, wherein the locking bars 34 and the release buttons 37 are represented by the same component, wherein a locking bar area 34 in turn locks onto the stop retainer 33, wherein the stop retainer 33 is formed on both sides pieces 36 of the folding parts 31. The two locking bars 34, or release buttons 37, respectively, are in turn pre-loaded by the spring elements 39, so that in their resting position they are pushed back by the side pieces 36 of the folding parts 31 and are present in pre-loaded form and snap back into their relaxed position blocking the folding part 31, so that the folding part 31 is secured against falling back into its resting position and remains in its functional position until the actuation of both release buttons 37. FIG. 10 in turn shows a side-collision protection as it is actually applied, namely with a cover plate 42, covering base plate 46, which is visible in FIG. 11 with removed the cover plate 42.

Figure 12:
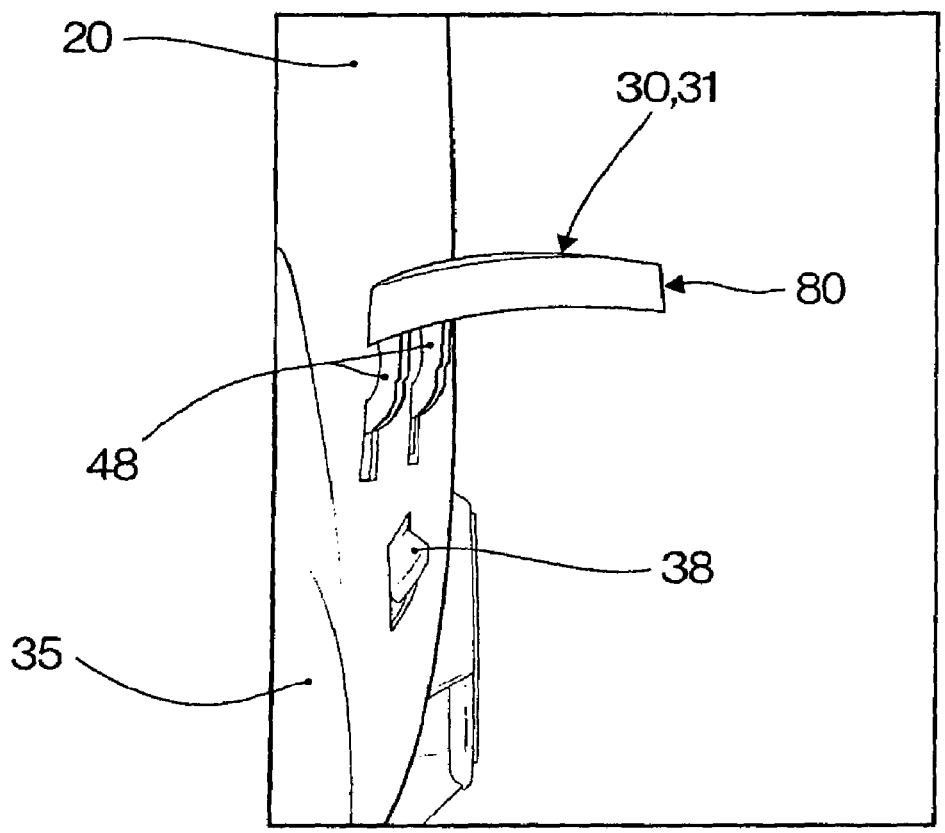
FIGS. 12-13 show a schematic illustration of a further embodiment of the side-collision protection, in functional and resting position.
Figure 13:
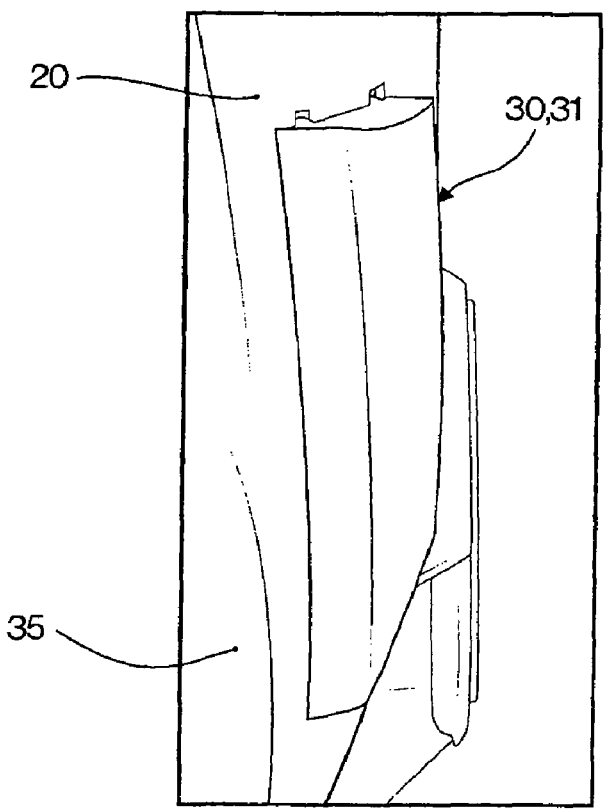
Figure 14:
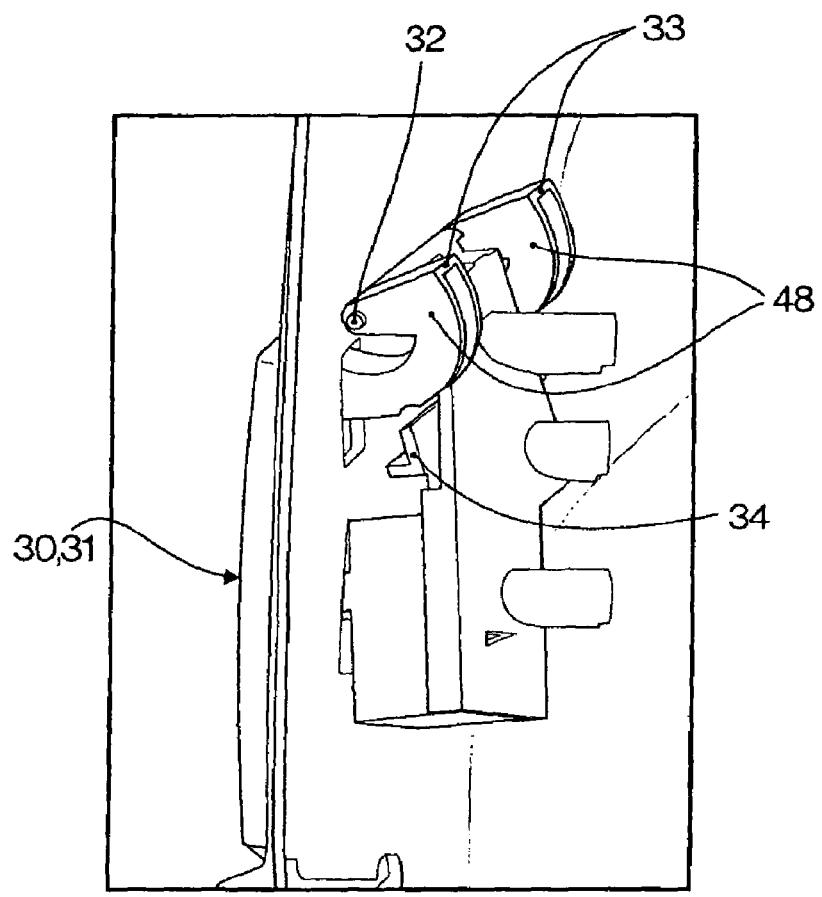
FIGS. 14-17 show a detailed schematic illustration of the function mechanism of the embodiment of a side-collision protection according to FIGS. 12 and 13.
Figure 15:
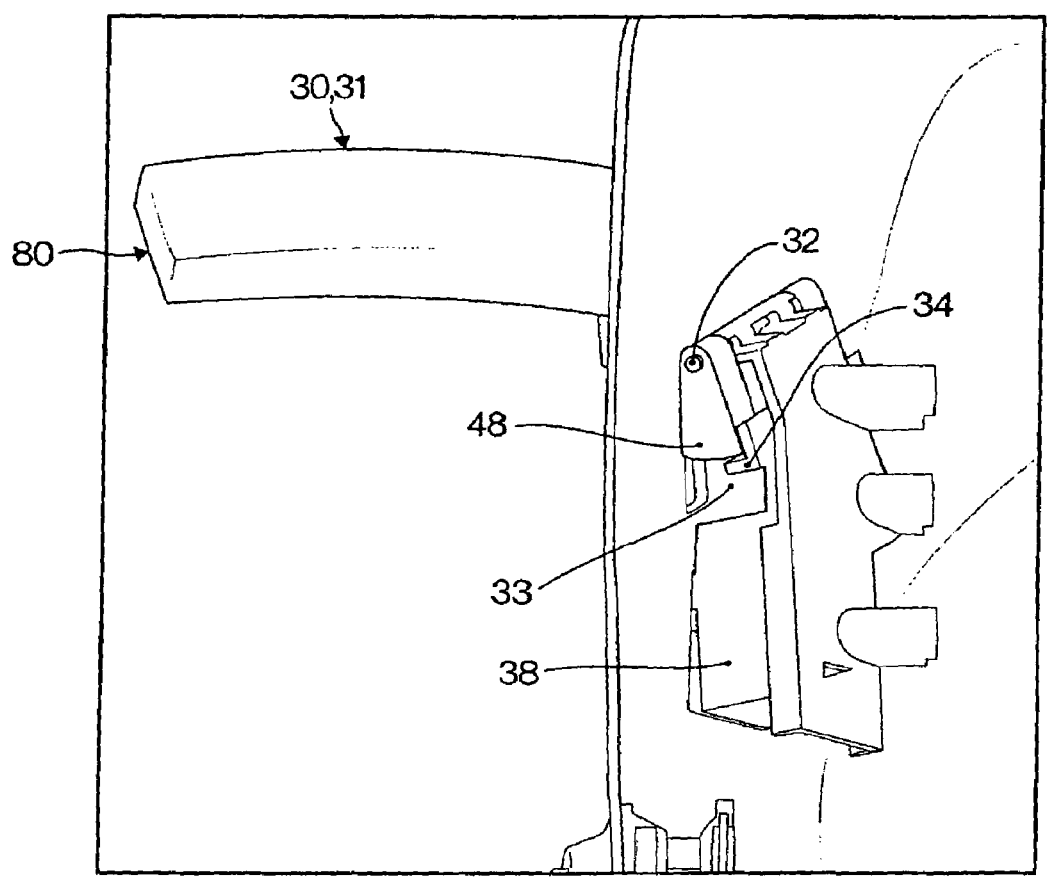
Figure 16:
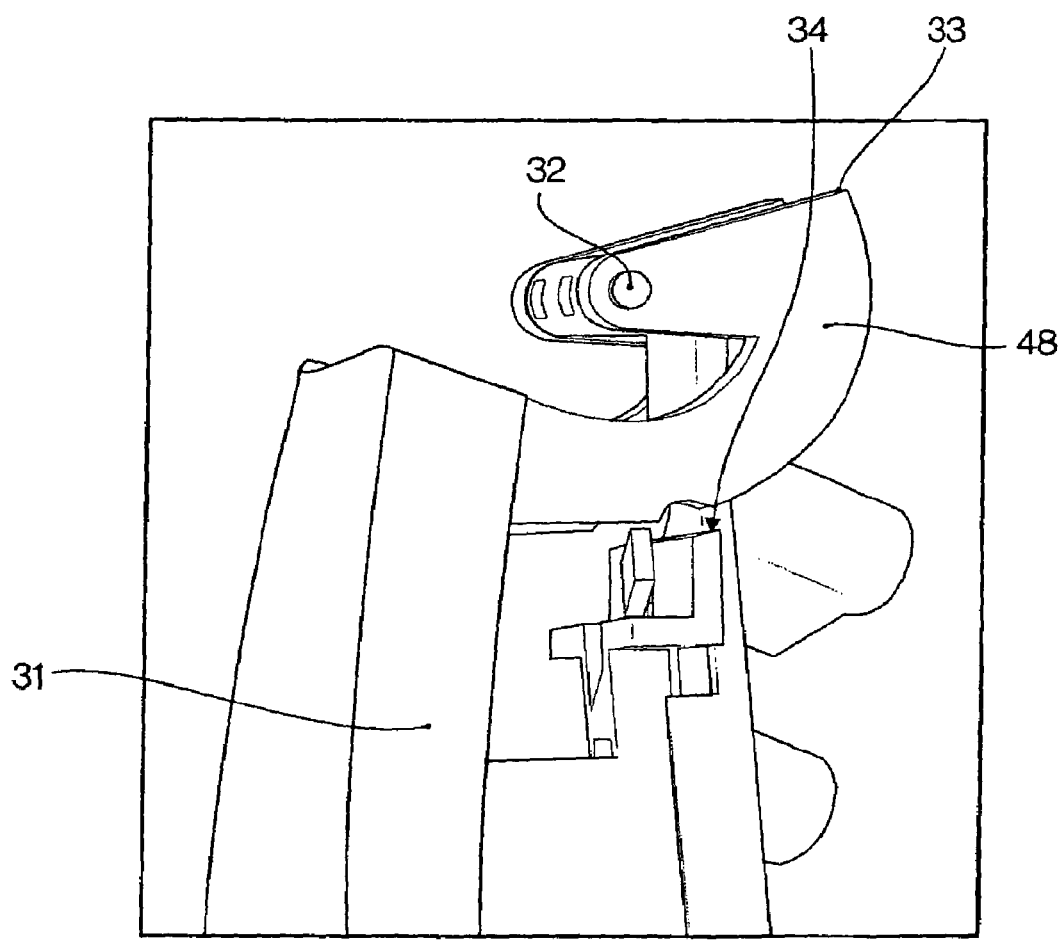
Figure 17:
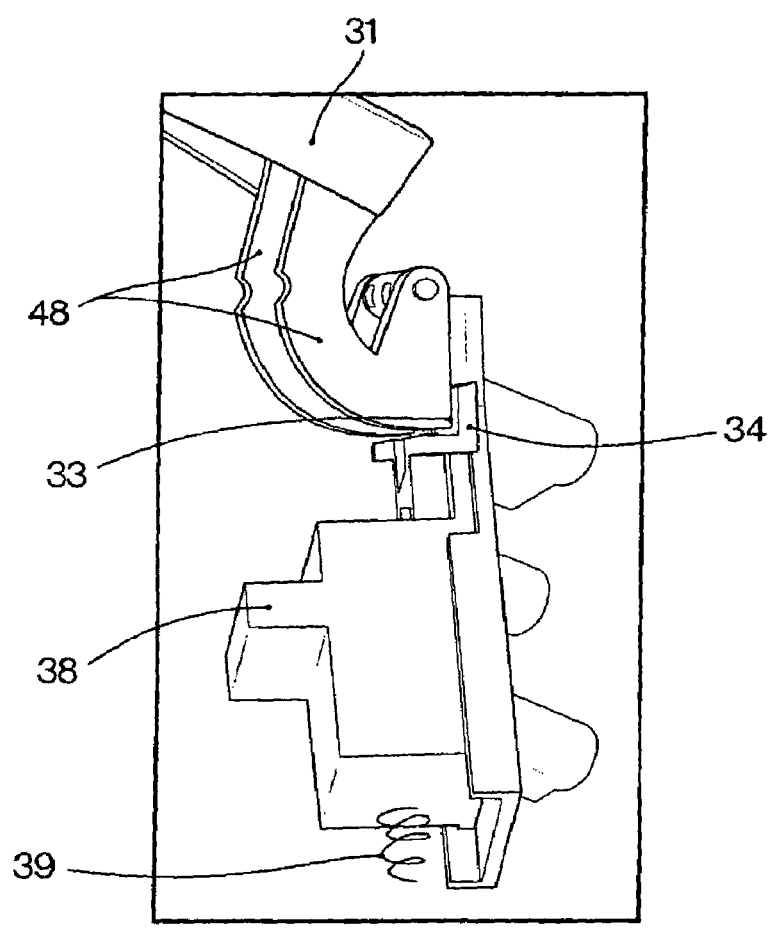

FIGS. 12 and 13 show another embodiment of a side-collision protection with the side element 30 formed as the folding part 31, in each case in a schematic illustration, wherein the folding part 31 is in its functional position in FIG. 12, and in its resting position in FIG. 13. In its resting position, the folding part 31 essentially rests flat on the side area 35 of the seat shell 20, wherein it can be recognized in FIG. 12 that the folding part 31 is linked to two holding devices 48, which extend through the seat shell 20 via respective openings. Furthermore, in FIG. 12, it can be recognized that a release slider 38 also extends through a respective opening through the seat shell 20 and is movable in a vertical direction, according to the indicated arrow, as well as in opposite direction.

FIGS. 14 through 17 show the functional mechanism of the embodiment according to FIGS. 12 and 13 schematically and in detail. Thus, in FIGS. 14 through 17, it can be recognized, that the holding devices 48 are movable around the axis 32 and stored on the axis 32. Each of the holding devices 48 features a stop retainer 33 which locks with locking bar 34, when the folding part 31 is moved from its resting position into its functional position. This interlock is particularly easy to recognize in FIGS. 15 and 17, as the folding part 31 is in its functional position in FIGS. 15 and 17. Here, the locking bar 34 is operatively connected with the release slider 38, namely for the most part designed uniformly therewith, wherein the component comprising the locking bar 34 and the release slider 38 is brought into a functional position by the spring element 39, so that the locking bar 34 is present in a pre-loaded position as long as the folding part 31 is in a resting position. Here, holding devices 48 are formed in such a way that they hold the component featuring the locking bar 34 in the pre-loaded position, as long as the folding part 31 isn't completely folded into its functional position. As soon as the folding part 31 reaches its functional position, the locking bar 34 locks with a stop retainer 33 which is formed on the holding devices 48. This function is especially easy to recognize in FIGS. 16 and 17.

Figure 18:
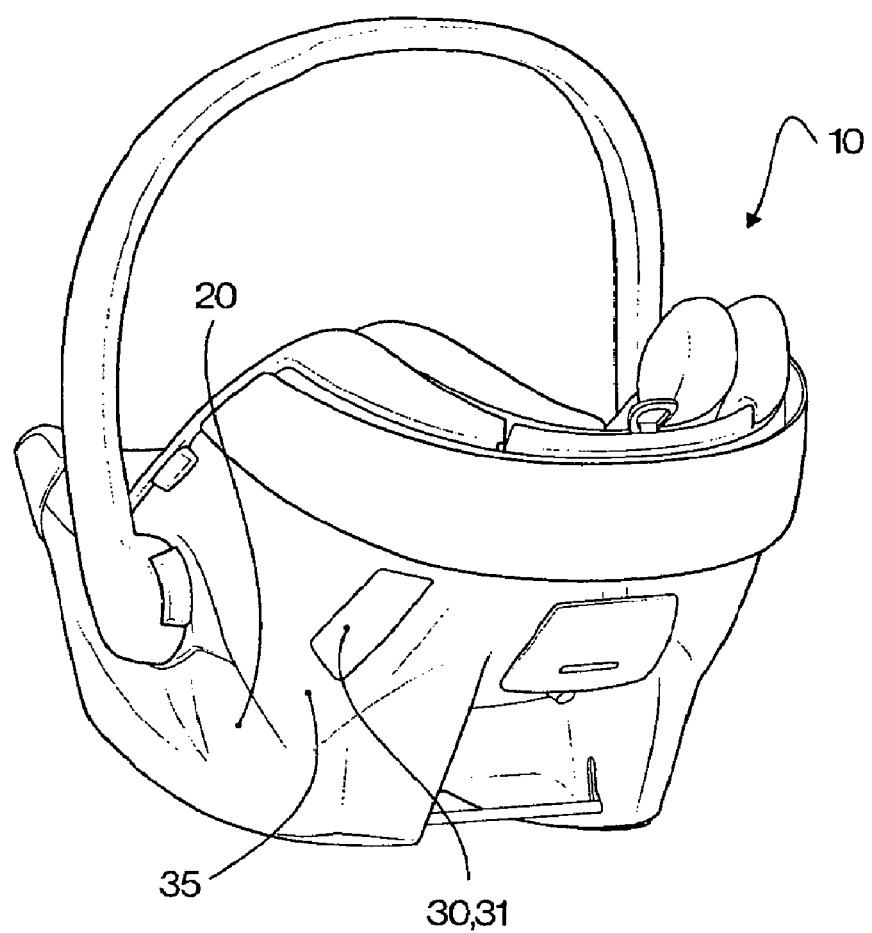
FIGS. 18-19 show further schematic views, schematic illustrations of an infant car seat according to an embodiment with a side collision protection that can be pushed into a side area of the infant car seat, each in its resting and functional position.
Figure 19:
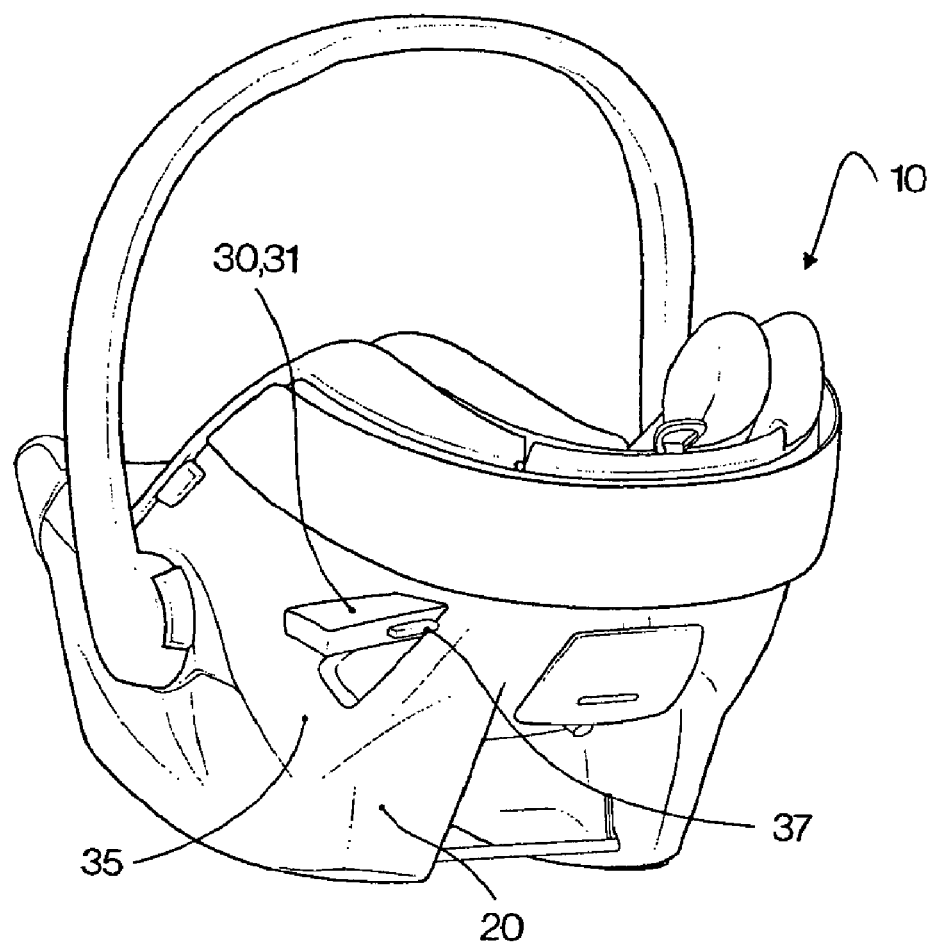

FIGS. 18 and 19 show a further embodiment of a child safety seat in the form of an infant car seat 10, wherein according to this embodiment, the folding part 31 may be folded into the side area 35 of the seat shell 20 in such a way that the folding part 31 sits even with side area 35 when in its resting position. This position is shown in FIG. 18. FIG. 19 shows the folding part 31 folded out in a functional position, wherein the release button 37 is visible. The embodiment shown in FIGS. 18 and 19 is located on the rotary axis 32 of a folding part 31, in turn within the seat shell 20, so that these aren't visible in FIGS. 18 and 19. This case again comprises a swivel mechanism as described in FIGS. 12 through 17, in which the component featuring locking bar 34, as well as the release slider 38, are shown in a resting position in a pushed back bottom position, and in a functional position in a resting top position, wherein once again it shall be noted, that the directions "top" "bottom" "right" and "left" only serve an explanatory purpose and that the side-collision protection may also be appropriate for other functional arrangements with regard to a child safety seat or an infant car seat. For releasing the folding part 31, according to this embodiment, the release slider 38 is moved downward in the manner indicated by the arrow in FIG. 12. In doing so, the stop retainer 30 is released from the lock of locking bar 34, so that the holding devices 48 can be swivelled back according to FIGS. 16 and 17, wherein the folding part 31 comes in contact with the seat shell 20, and, depending on the embodiment, is brought into its resting position on the outside of the seat shell or pushed into the side area 35 of the seat shell.

At this point it shall be noted, that all above described parts, individually and in any combination, especially those details illustrated in the drawings, are claimed as essential to the disclosure. Variations thereof are known to the person skilled in the art.

LIST OF REFERENCE NUMERALS

10 Child safety seat, infant car seat
20 Seat shell
30 Side element
31 Folding part
32 Axis
33 Stop retainer
34 Locking bar
35 Side area
36 Side pieces
37 Release button
38 Release slider
39 Spring element
40 Motor vehicle contact area
42 Cover plate
44 Locking bar axis
46 Base plate
48 Holding device
50 Length
60 Seat area
70 Back section
80 End section
90 Fixation mechanism
100 Motor vehicle seat

The invention claimed is:

1. A child safety seat or infant car seat for mounting onto a motor vehicle seat, particularly a motor vehicle passenger seat, the child safety seat or infant car seat comprising a seat shell and a side-collision protection extension mounted on the seat shell, which may be brought from a resting position into a functional position and vice versa,
characterized in that the side-collision protection extension, particularly on both sides of the seat shell, is locked and positioned in the functional position in such a way that side forces are transferred into the seat shell,
wherein the side-collision protection extension does not define, in either the functional position or the resting position, a supporting surface for the child sitting in the child safety seat and in that
an overall width of the child safety seat is larger when the side-collision protection extension is in the functional position than an overall width of the child safety seat when the side-collision protection extension is in the resting position,
wherein the side-collision protection extension comprises a side element, wherein the side element is configured to be folded-out, swivelled-out or extended telescopically, wherein said side-collision protection extension further comprises a locking element and wherein the seat shell comprises a counter-element, wherein the locking element is configured to releasably lockingly engage the counter-element for locking said side-collision protection extension in said functional position and configured to freely allow movement of the side-collision protection extension in said resting position.

2. A child safety seat according to claim 1,
wherein the side element, in its resting position, rests essentially flat on or is essentially flush with a side area of the seat shell.

3. A child safety seat according to claim 1,
wherein the side element is configurable as regards to at least one of its length and its height position.

4. A child safety seat according to claim 1,
wherein the side element comprises a snap-in control (click lock) mechanism, snap-action mechanism, folding mechanism, ratchet mechanism, telescope mechanism, thread or screwing mechanism or pulley mechanism, particularly for configuring at least one of length and fixation.

5. A child safety seat according to claim 1,
wherein the side element is arranged above a seat area of the child safety seat.

6. A child safety seat according to claim 1,
wherein the side element is arranged in a back section, particularly rearward of the back contact area of the child safety seat.

7. A child safety seat according to claim 1,
wherein the side element is one of two side elements in the seat shell, wherein each of the two side elements can be actuated and configured independently of each other.

8. A child safety seat according to claim 1, characterized in that the side elements provided on each side of the seat shell are connected with each other, particularly within a seat shell construction.

9. A child safety seat according to claim 2, characterized in that the side element is designed as a folding part, which may be rotated around an axis for the purpose of switching from a resting position to a functional position and vice versa, wherein the folding part features at least one stop retainer onto which a locking bar locks, so that folding part is locked in a functional position, wherein the fixation may be released by a user that actuates a release button or a release slider, one of which has been preferably allocated per the locking bar.

10. A child safety seat according to claim 9, characterized in that the locking bar in its resting position is pre-loaded in such a manner, particularly by a spring element, that the locking bar is automatically brought into a predefined relaxed position in the event that the folding part is brought from the resting position into a functional position, and thus interlocks with the stop retainer.

11. A child safety seat according to claim 9, characterized in that a locking bar in its resting position is held in a pre-loaded position by a folding part, particularly by the side pieces of the folding parts.

12. A child safety seat according to claim 9, characterized in that the folding part features a cogging, by which a multitude of stop retainers is defined.

13. A child safety seat according to claim 1, characterized in that the side element features a receptor and/or contact and/or bonding and/or locking apparatus for interlocking of a neighbouring side element, particularly a neighbouring child safety seat.

14. A child safety seat according to claim 1,
wherein the side element comprises an end section in a form or shape of a mushroom or disk.

15. The child safety seat according to claim 2, wherein the side element is pushed into the side area.

16. The child safety seat according to claim 2, wherein the side element is slid into the side area.

17. The child safety seat according to claim 2, wherein the side element is pushed into and slid into the side area.

18. A child safety seat or infant car seat for mounting onto a motor vehicle seat, particularly a motor vehicle passenger seat, the child safety seat or infant car seat comprising a seat shell and a side-collision protection extension mounted thereon, which may be brought from a resting position into a functional position and vice versa,
characterized in that the side-collision protection extension, particularly on both sides of the seat shell, is locked and positioned in such a way that side forces are transferred into the seat shell,
wherein the side-collision protection extension does not define, in either the functional position or the resting position, a supporting surface for the child sitting in the child safety seat and in that
the side-collision protection extension defines in its functional position a maximum width of the child seat,
wherein the side-collision protection extension comprises a side element that comprises a snap-in control mechanism, snap-action mechanism, folding mechanism, ratchet mechanism, telescope mechanism, thread or screwing mechanism or pulley mechanism, for configuring at least one of length and fixation,
wherein said side-collision protection extension further comprises a locking latch configured to be selectively slidingly received by a latch receiver, said locking latch engaging said latch receiver in a first configuration operable to lock said side-collision protection extension in said functional position, said locking latch being out of engagement with said latch receiver in a second configuration operable to freely allow said side-collision protection extension to move from the resting position toward the functional position.

19. A child safety seat or infant car seat for mounting onto a motor vehicle seat, particularly a motor vehicle passenger seat, the child safety seat or infant car seat comprising a seat shell and an elongate side-collision protection extension defining a longitudinal axis mounted thereon, which may be brought from a resting position in which the longitudinal axis extends along a surface of the seat shell into a functional position in which the longitudinal axis extends laterally outwardly from the seat shell and vice versa,
characterized in that the elongate side-collision protection extension, particularly on both sides of the seat shell, is locked in the functional position and positioned in such a way that side forces are transferred into the seat shell along the longitudinal axis of the elongate side-collision protection extension and in that
the elongate side-collision protection does not define, in either the functional position or the resting position, a supporting surface for the child sitting in the child safety seat and in that
the elongate side-collision protection extension defines in its functional position a maximum width of the child seat,
wherein the elongate side-collision protection extension comprises a side element, wherein the side element is configured to be folded-out, swivelled-out, or extended telescopically,
wherein said elongate side-collision protection extension further comprises a locking element configured to engage a counter-element for locking said elongate side-collision protection extension in said functional position.

20. A child safety seat or infant car seat for mounting onto a motor vehicle seat, comprising:
a seat shell configured for mounting onto the motor vehicle seat;
a side-impact extension mounted to at least one side of the seat shell and configurable in a stowed, resting position adjacent the seat shell to an extended, functional position extending laterally outwardly from the seat shell,
wherein the side-collision protection extension does not define, in either the functional position or the resting position, a supporting surface for the child sitting in the child safety seat; and
a lock mechanism having a latch, a latch receiver sized to selectively receive the latch, and a biasing element positioned to urge the latch into engagement with the latch receiver, wherein the latch is free to slide into a locked engagement with the side-impact extension under the biasing force of the biasing element when the side-impact extension is in the functional position to define a locked configuration, and the latch is out of the locked engagement when the side-impact extension is in the resting position.

21. A child safety seat or infant car seat for mounting onto a motor vehicle seat, comprising:
   a seat shell;
   a side-collision protection extension mounted to at least one side of the seat shell and comprising a side element, wherein the side element defines an outer face,
   wherein the side-collision protection extension may be brought from a stowed, resting position in which the outer face extends along the surface of the seat shell into an extended, functional position in which the outer face extends laterally outwardly from the seat shell and vice versa,
   wherein the side-collision protection extension is locked in the functional position and positioned in such a way that side forces are transferred into the seat shell via the side element,
   wherein the side-collision protection extension does not define, in either the functional position or the resting position, a supporting surface for the child sitting in the child safety seat and
   wherein the side-collision protection extension defines in its functional position a maximum width of the child seat,
   wherein side element is configured to be folded-out, swivelled-out, or extended telescopically, and
   wherein said side-collision protection extension further comprises a locking element configured to cooperate with a counter-element for locking said side-collision protection extension in said functional position and configured to freely allow movement of the side-collision protection extension in said resting position.

* * * * *